United States Patent
Oliver et al.

(12) 
(10) Patent No.: US 6,345,706 B1
(45) Date of Patent: Feb. 12, 2002

(54) ELECTRICAL COUPLING ASSEMBLY FOR A MAGNETORHEOLOGICAL DAMPER

(75) Inventors: Michael Leslie Oliver, Xenia; William Charles Kruckemeyer, Beavercreek, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/394,759

(22) Filed: Sep. 13, 1999

(51) Int. Cl.[7] .................................................. F16F 9/34
(52) U.S. Cl. ................................ 188/282.2; 188/267.2; 439/95; 439/101
(58) Field of Search ........................... 188/267.1, 267.2, 188/282.2, 318, 269; 267/140.15; 439/34, 92, 95, 96, 101

(56) References Cited

U.S. PATENT DOCUMENTS

| | | | | |
|---|---|---|---|---|
| 4,789,343 A | * | 12/1988 | Dougherty et al. | 439/34 |
| 4,846,318 A | * | 7/1989 | Groves | 188/282.2 |
| 5,011,426 A | * | 4/1991 | Colleran et al. | 439/357 |
| 5,090,524 A | * | 2/1992 | Miller et al. | 188/266.2 |
| 6,007,345 A | * | 12/1999 | Francis et al. | 188/282.2 |
| 6,036,500 A | * | 3/2000 | Francis et al. | 439/34 |

* cited by examiner

*Primary Examiner*—Robert J. Oberleitner
*Assistant Examiner*—Mariano Sy
(74) *Attorney, Agent, or Firm*—Robert M. Sigler (57) ABSTRACT

An electrical coupling assembly for a damper, the coupling assembly including a base and a rod received through the base. The rod has a threaded connector end and a conductor extending through the rod from the connector end. The coupling assembly further includes a conductive nut threaded onto the connector end of the rod and a plug housing including a ground lead and a power lead, the power lead being electrically coupled to the conductor. The coupling assembly has a conductive member engaging the plug housing and the nut, the conductive member being electrically coupled to the ground lead. The coupling assembly is particularly suited for use in a strut having an outer tube coaxial with the inner tube and connected to the rod and the wheel suspension assembly of the vehicle so as to absorb the side loads applied to the strut. In such a strut, the piston rod is "upside down", with the piston at the top and the coupling assembly at the bottom, where it is fully exposed to environmental dirt, moisture, contaminants, temperatures and road induced shocks.

41 Claims, 8 Drawing Sheets

ELECTRICAL COUPLING ASSEMBLY FOR A MAGNETORHEOLOGICAL DAMPER

TECHNICAL FIELD

The present invention relates to electrical coupling assemblies, and more particularly, to electrical coupling assemblies sufficiently rugged to be used in vehicle magnetorheological shock absorbing systems.

BACKGROUND OF THE INVENTION

Certain types of shocks, struts and other damping components used in vehicle shock absorbing systems have damping characteristics which can be varied to adjust the damping component to prevailing conditions. The damping characteristics may be varied to account for a number of factors, such as ambient temperature and the weight distribution, speed, and cornering status of the associated vehicle. Such dampers have generally contained adjustable valving, which introduces complexity and extra cost.

Recently, however, a new type of adjustable dampers are being introduced. Magnetorheological fluid dampers, also known as MR dampers, damp shock forces sustained by the vehicle by transmitting the forces to a piston which is pushed through a chamber filled with magnetorheological fluid. The piston is provided with an electric coil, and the flow of electric current in the coil may be controlled to vary the properties of the magnetorheological fluid pumped by the piston through an orifice in or adjacent the piston. In this manner the flow of magnetorheological fluid through the piston, and thereby the amount of damping, is controlled.

The piston that is pushed though the magnetorheological fluid is mounted onto the end of a rod, and electric current is provided to the coil in the piston from the end of the rod opposite the piston by means of an electric conductor in the rod. The conductor is electrically coupled to a connector, or coupling assembly, mounted on one end of the damper. The coupling assembly receives a plug that delivers power from the vehicle's electrical system. In this manner, the coupling assembly connects the vehicle's electrical system to the coil in the damper. However, existing coupling assemblies are difficult to assemble, lack robustness, and may not be fluid-tight to prevent water or other contaminants from contacting the wires or otherwise impairing the operation of the damper. And this is true even though the typical automotive strut is constructed with the piston at the bottom of the piston rod, with the opposite end of the rod projecting through a shock tower opening into the vehicle engine compartment. A coupling assembly for such a typical strut is thus at least somewhat protected from the outside environment.

But in order to relieve side loads on a damper piston rod, some struts are provided with an outer tube bearing a bracket adjacent its lower end for attachment to a vehicle wheel suspension assembly and which is closed at its lower end by a strut base. One end of the piston rod is fixed to the middle of the strut base, and the rod projects upward into an inner tube containing the piston and fluid. The top of the inner tube is fixed to the vehicle body, so that the rod and piston thus move axially together with the outer tube and wheel assembly in opposition to the inner tube and vehicle body. Side loads applied to the strut are received by bearing elements between the inner and outer tubes; and very little of these side loads are thus applied to the rod. A rod guide and seal assembly is provided to close the bottom of the inner tube, and the rod projects downward through the assembly.

An electrical conductor from a coil in the piston in such a strut exits the bottom of the rod; and the coupling assembly in such an "upside down" structure must therefore be placed at the bottom of the strut. In this position low in the vehicle suspension, out of the protective structure of the vehicle body, the coupling assembly is fully exposed to dirt, moisture and other contaminants, as well as extreme temperatures and physical shocks at the higher frequencies and amplitudes of the vehicle wheel rather than those of the vehicle body.

Accordingly, there is a need for an electrical coupling assembly which is durable, fluid tight, and easy to assemble. There is also a need for a MR strut that can resist side loads, has a rod with a relatively small diameter, and is controllable to adjust the strut to prevailing conditions.

SUMMARY OF THE INVENTION

It is an object of the present invention to provide an electrical coupling assembly which is sufficiently rugged and durable to be used in automotive applications; an electrical coupling assembly which is generally fluid-tight to protect the internal components of the coupling assembly and the associated mechanism; and an electrical coupling assembly which is relatively easy to fabricate and install. It is a further object of the invention to provide such an electrical coupling assembly in a controllable MR strut damper that has an outer tube to increase the capacity of the strut damper to resist side loads.

In one embodiment, the invention is an electrical coupling assembly for a damper, the coupling assembly including a base and a rod received through the base. The rod has a threaded connector end and a conductor extending through the rod from the connector end. The coupling assembly further includes a conductive nut threaded onto the connector end of the rod and a plug housing including a ground lead and a power lead, the power lead being electrically coupled to the conductor. The coupling assembly has a conductor engaging the plug housing and the nut, the conductor being electrically coupled to the ground lead.

In another embodiment of the invention, a magnetorheological damper for damping forces applied to a wheel suspension assembly of a vehicle includes an inner tube filled with magnetorheological fluid. The inner tube is connected to a frame of the vehicle, and a piston is located in the inner tube. A rod is connected to the piston and extends through the inner tube. The damper has an outer tube coaxial with the inner tube, the outer tube being connected to the rod and the wheel suspension assembly of the vehicle. The rod has a conductor extending along its length. The damper also includes an electrical coupling assembly connected to the rod and the conductor, the coupling assembly having a plug housing for receiving an external plug and for electrically coupling the external plug to the conductor. Other objects and advantages of the present invention will be apparent from the following description, the accompanying drawings and the appended claims.

DESCRIPTION OF THE PREFERRED EMBODIMENTS

Figure 1:
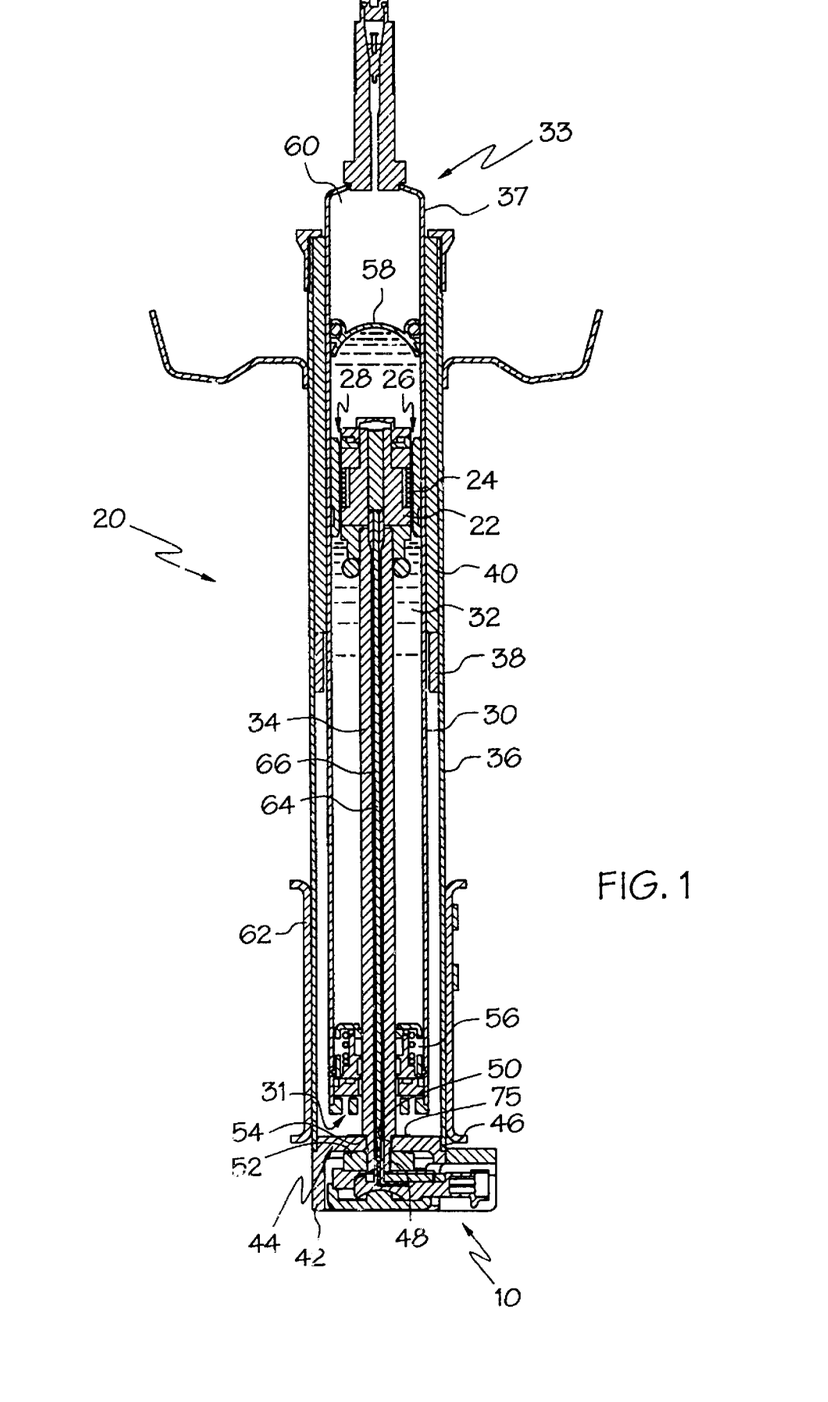
FIG. 1 is a side elevation in section of a damper incorporating one embodiment of the coupling assembly of the present invention.

As shown in FIG. 1, one embodiment of the electrical coupling assembly 10 of the present invention is illustrated in conjunction with a monotube strut 20 of a magnetorheological damping system. However, it should be understood that the coupling assembly of the present invention may be employed in a variety of magnetorheological damping applications in addition to struts, shocks or dampers, and the embodiment shown in FIG. 1 is illustrative of only a single application. The monotube strut 20 of FIG. 1 includes a piston 22 having a coil 24 around its outer surface. The piston 22 includes a pair of longitudinally extending internal orifices 26, 28. The piston 22 is maintained inside an inner tube 30 and is immersed in magnetorheological fluid 32 that fills the inner tube 30. The inner tube 30 includes a closed end 33 located near the top of the strut damper 20 as shown in FIG. 1, and an open end 31 located near the bottom of the strut damper 20. A rod 34 is threaded into the piston 22 and extends through the inner tube 30. The rod 34 passes through the open end 31 of the inner tube 30.

The inner tube 30 is received in, and is axially movable relative to, an outer concentric tube 36. The outer tube 36 provides structural strength to the strut 20, and helps to accommodate side loads. A bearing sleeve support (shown schematically at 38) and a set of monotube seals and bearings (shown schematically at 40) guide the relative movement between the inner tube 30 and the outer tube 36. The space between the inner tube 30 and outer tube 36 is not designed as a reservoir, although it is possible that some fluid 32 may enter that space. A generally cylindrical strut base 42 covers a lower end 44 of the outer tube 36, and the strut base includes a shoulder 46 that tightly engages the open lower end 44 of the outer tube 36 to seal the open end. The strut base 42 preferably is welded to and seals the open lower end 44 of the outer tube 36.

The rod 34 includes a threaded end 48 that protrudes through a central hole 50 in the strut base 42, and a conductive nut 52 is threaded on the threaded end 48 to couple the strut base 42 to the rod 34. The rod 34 is fixed to the strut base 42 such that when the outer tube 36 moves relative the inner tube 30, the rod 34 moves axially within the inner tube 30. The rod 34 includes a shoulder 54 that engages the strut base 42. A washer 75 is located between the shoulder 54 of the rod 34 and the strut base 42. A rod guide assembly 56 is located adjacent to a lower end of the inner tube 30 and receives the rod 34 therein. The rod guide assembly 56 guides the relative movement between the inner tube 30 and the rod 34.

A slidable gas cup 58 is located in the inner tube 30 seals a pressure cavity 60 in the inner tube 30 that is filled with pressurized gas, such as nitrogen. The upper end of the inner tube 30 is connected to the frame of the vehicle (not shown), and the lower end of the outer tube 36 is connected to a vehicle wheel suspension assembly (not shown) by the bracket 62. Accordingly, when an associated wheel suspension assembly transmits forces to the bracket 62 and thereby to the outer tube 36, rod 34 and piston 22 are moved axially relative the inner tube 30. The movement of the piston 22 within the inner tube 30 forces fluid 32 through the orifices 26, 28 in the piston, which damps the movement of the piston, rod 34 and outer tube 36. As the piston 22 moves within the inner tube 30, the gas cup 58 also moves within the inner tube 30 to accommodate the change in volume in the inner tube 30 as the rod 34 is urged into, or withdrawn from, the inner tube.

The piston 22 includes a coil 24 located adjacent to the orifices 26, 28. The current flowing through the coil 24 can be selectively controlled to control the viscosity of the magnetorheological fluid immediately adjacent the coil. In this manner the flow rate of magnetorheological fluid 32 through the orifices 26, 28 as the piston 22 moves within the inner tube 30 can be controlled. A conductor 64 is electrically connected to the coil 24 and extends through the center of the rod 34, and a shroud 66 insulates the conductor 64. The coupling assembly 10 receives an external plug (not shown) to connect the conductor 64 to the vehicle electrical system (not shown).

It is desired to minimize the change in volume in the inner tube 30 as the rod 34 moves into, or is retracted out of, the inner tube. Thus it is desired to reduce the diameter of the rod 34. However, in conventional struts the rod 34 must accommodate side loads, and thus its thickness cannot fall below a given minimum diameter. In the present invention, the outer tube 36 provides structural support to the strut damper to help accommodate sides loads, which enables the diameter of the rod 34 to be reduced. Because the diameter of the rod 34 is reduced below a prior art strut without an outer tube 36, the change in volume in the inner tube 30 is reduced, which in turn minimizes the movement of the gas cup 58 in response to movement of the piston 22.

Conventional single tube strut dampers are inverted compared to the damper illustrated in FIG. 1. In particular, a conventional single tube strut damper is mounted such that the open end 31 of the inner tube 30 is located near the top of the strut damper and is attached to the frame of the vehicle, and the closed end 33 of the inner tube 30 is located near the bottom of the strut damper and attached to the wheel suspension assembly. However, when the outer tube 36 is used, it is preferred to orient the strut damper 20 as shown in FIG. 1. If the strut damper 20 were inverted from the position shown in FIG. 1, the bracket 62 would have to be attached to portion 37 of the inner tube 30 that extends beyond the outer tube 36. The welding operations that are required to attach the bracket 62 to the inner tube 30 can distort the inner tube. Furthermore, because the inner tube 30 has a smaller diameter than the outer tube 36, it is more difficult to attach the bracket 62 to the inner tube 30.

An additional problem that would result from "inverting" the strut damper 20 of FIG. 1 is that the portion 37 of the inner tube 30 that extends axially beyond the outer tube 36 would have to be lengthened to provide sufficient surface area to receive the bracket 62. This would increase the overall length of the strut damper and make it more difficult to fit into a vehicle. Furthermore, the increased diameter of the outer tube 36 relative the inner tube 30 makes it more difficult to couple the outer tube 36 to the frame of the vehicle.

Thus, the strut damper 20 of FIG. 1 typically is mounted onto a vehicle such that the coupling assembly 10 is located at the bottom of the strut damper 20. However, in this orientation the coupling assembly 10 is no longer located in the protected environment of the engine compartment, and is exposed to various environmental conditions, including standing water, salt spray and the like. Furthermore, if the strut damper 20 is dropped during installation, it is likely to be dropped on the coupling assembly 10 because the coupling assembly 10 is located on the bottom of the strut damper 20. Thus, it is important that the electrical coupling assembly 10 be durable, robust, and fluid tight.

Figure 2:
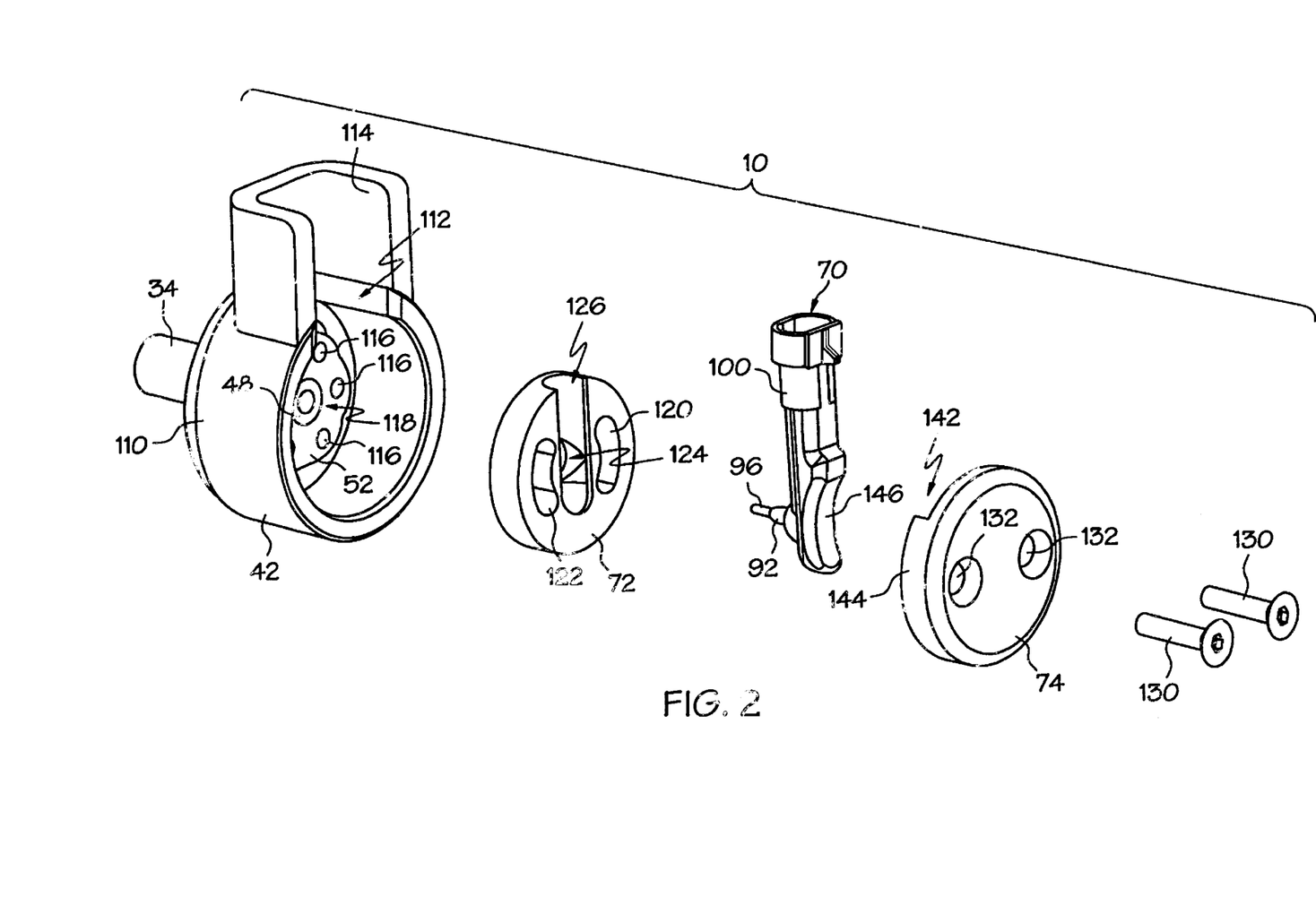
FIG. 2 is an exploded, perspective view of the coupling assembly of FIG. 1.
Figure 7:
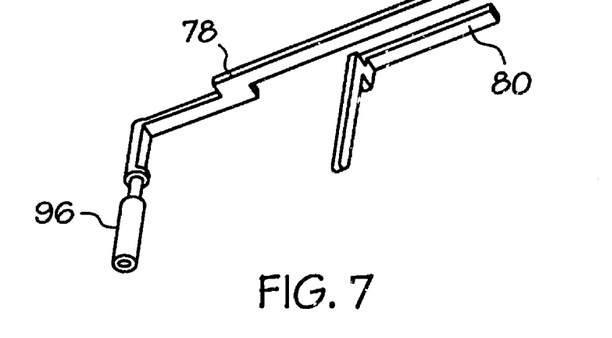
FIGS. 7–9 are perspective views showing a preferred method of construction of the plug housing of FIG. 3.
Figure 8:
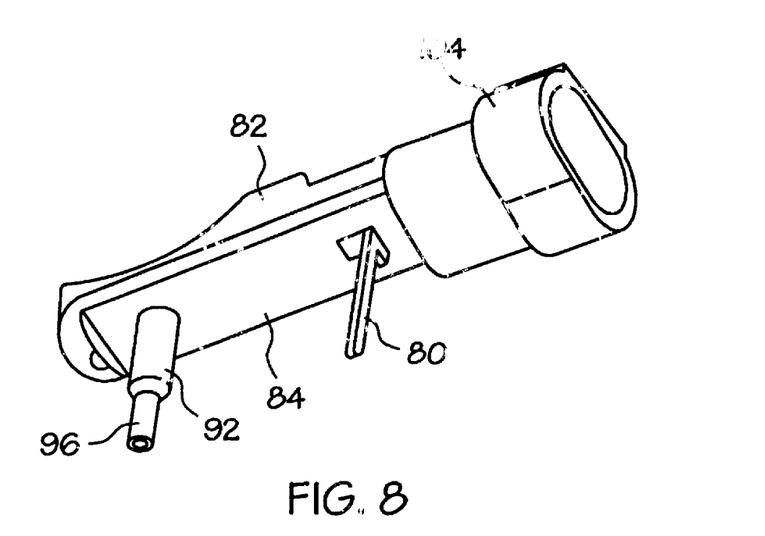
Figure 9:
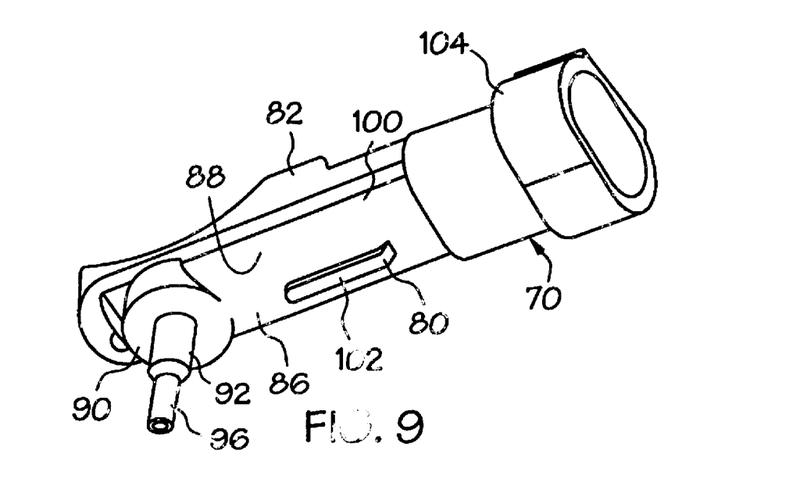
Figure 10:
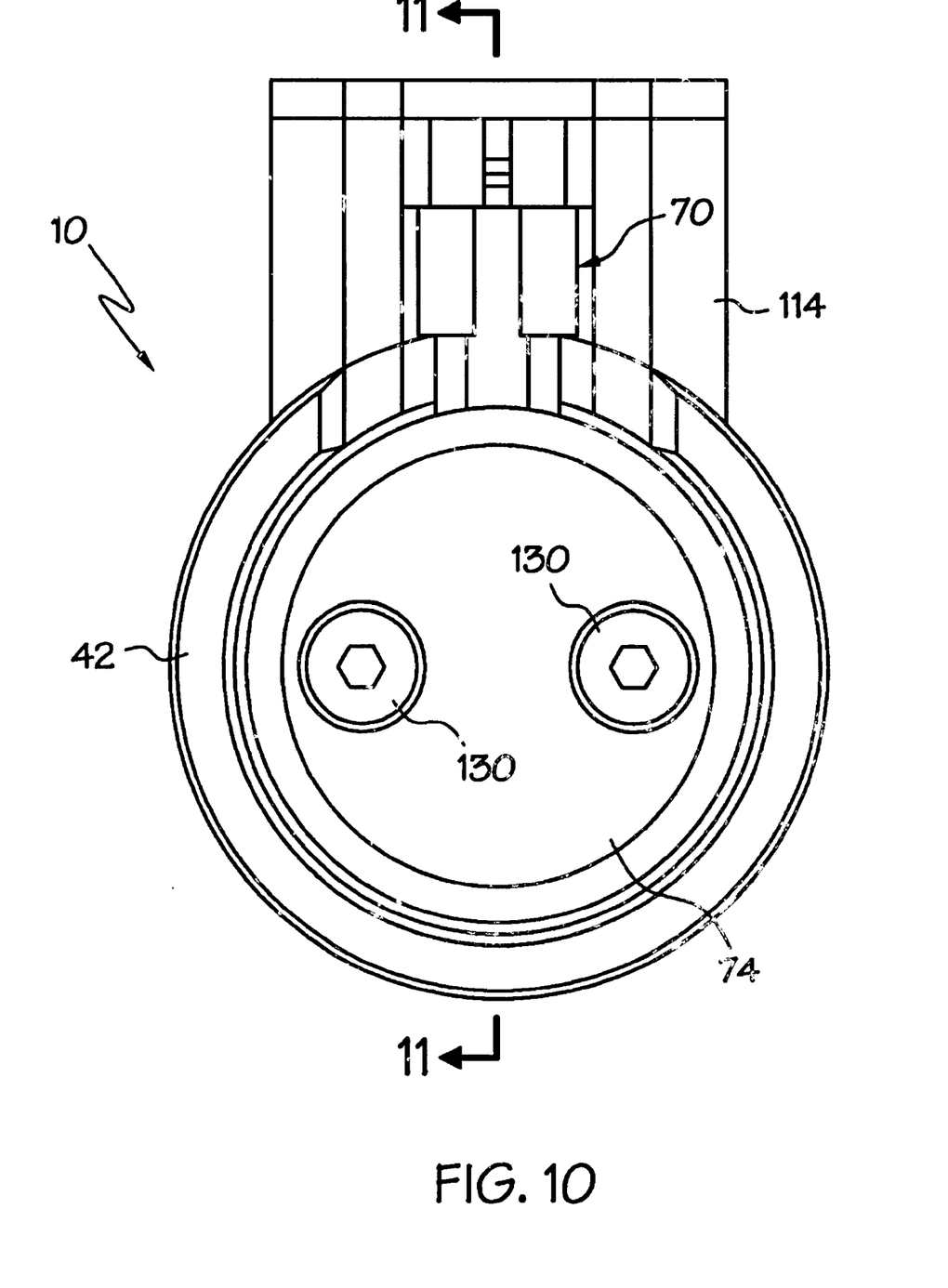
FIG. 10 is an end elevational view of the coupling assembly of FIG. 2.

As shown in greater detail in FIG. 2, the coupling assembly 10 of FIG. 1 includes the strut base 42, a conductive nut 52, a spacer 72, a plug housing 70, and a conductive cap 74. The structure and operation of the plug housing 70 is disclosed in U.S. application Ser. No. 09/098,868, filed Jun. 17, 1998 and issued as U.S. Pat. No. 6,007,345, the disclosure of which is hereby incorporated by reference. The assembly of the plug housing 70 is briefly discussed herein, and FIGS. 7–9 illustrate the preferred steps of forming the plug housing 70. A power lead 78 and a ground lead 80 are formed in the shape and orientation shown in FIG. 7. The power lead 78 includes a cylindrical connector 96 at one end. As shown in FIG. 8, a base 82 is formed as an overmold over the ground lead 80 and power lead 78. The cylindrical connector 96 protrudes through a nozzle portion 92 of the base 82.

An elastomer seal 86 is then located on a forward surface 84 of the base 82. As shown in FIG. 9, and the elastomer seal 86 includes a forward outer surface 88 of the plug housing 70. The elastomer seal 86 includes a ring portion 90 that fits over the nozzle 92 of the base 82. When fully assembled, the plug housing 70 includes a body portion 100 and a forwardly extending nozzle portion 92 that is perpendicular to the body portion. The ground lead 80 protrudes through the base 82 and the seal 86 (see FIG. 8), and the ground lead 80 is bent flush against the elastomer seal 86 (see FIG. 9) to help retain the elastomer seal 86 in place. The portion of the ground lead 80 that is located on the forward outer surface 88 of the plug housing 70 is termed the coupling portion 102 of the ground lead 80.

Figure 3:
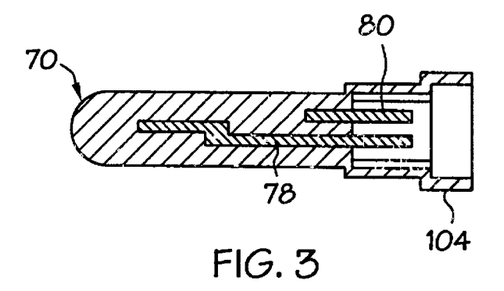
FIG. 3 is a top plan view in section of the plug housing of the coupling assembly of FIG. 2.
Figure 4:
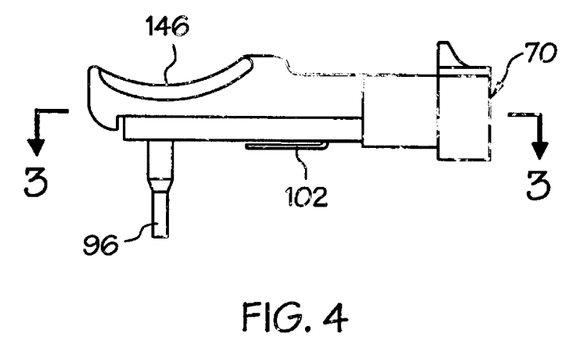
FIG. 4 side elevational view of the plug housing of FIG. 3.
Figure 5:
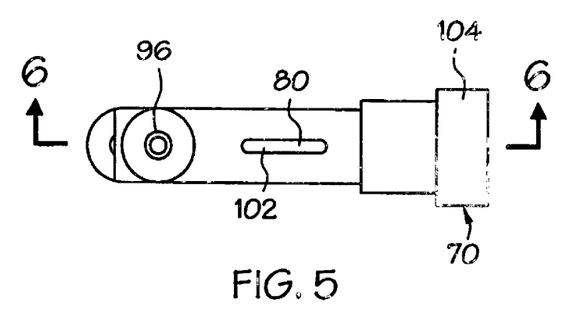
FIG. 5 is a top plan view of the plug housing of FIG. 3.
Figure 6:
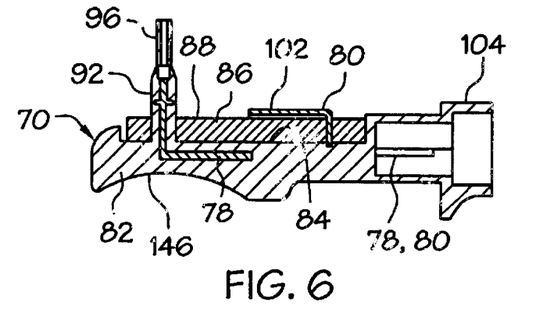
FIG. 6 is a section taken at line 6—6 of FIG. 5.

The plug housing 70 also includes a port 104 to receive an external plug (not shown) that couples the power lead 78 to the vehicle's electrical system. The power lead 78 extends from the port 104 through the body portion 100 and passes through the nozzle portion 92, terminating in the cylindrical connector 96. When the plug housing 70 is mounted on the strut 20, the conductor 64 is received in the cylindrical connector 96 to connect the power lead 78 to the conductor 64. In this manner, electrical power is delivered from the vehicle's electrical system to the coil 24 of the piston 22, and the current passed through the coil 24 can be controlled. The external plug may also include a ground wire, and the ground lead 80 of the coupling assembly 10 connects the ground wire to ground, as will be discussed in greater detail below.

Returning to FIG. 2, the side wall 110 of the strut base 42 includes a slot 112 shaped to receive the body portion 100 of the plug housing 70 therethrough and a flange 114 which extends outwardly from the slot 112 to protect the body portion 100 of the plug housing 70. The conductive nut 52 includes a plurality of outer threaded holes 116 spaced about its periphery, and also includes a central threaded hole 118 that receives the connector end 48 of the rod 34.

Figure 11:
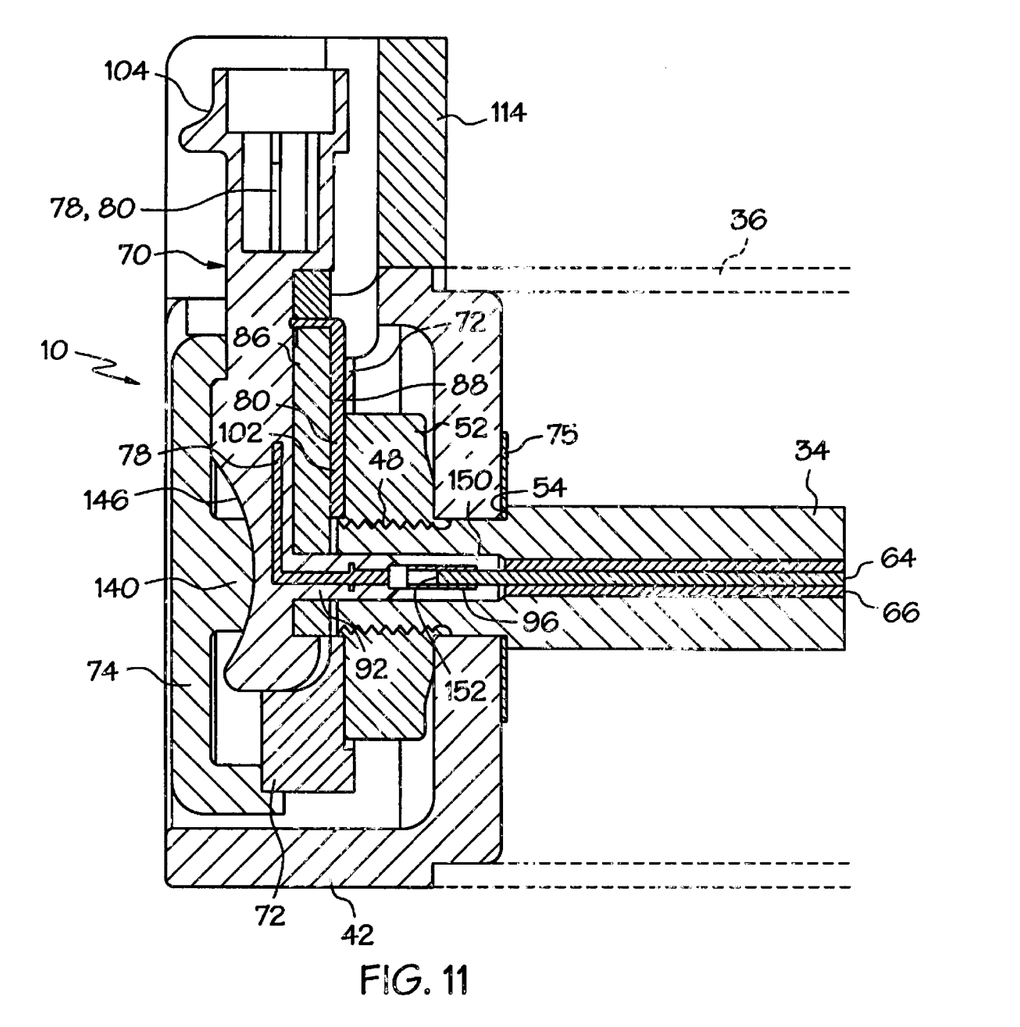
FIG. 11 is a section taken at line 11—11 of FIG. 10.

The conductive spacer 72 has a pair of generally arcuate apertures 120, 122 and a central through hole 124. The spacer 72 is located between the plug housing 70 and the conductive nut 52. The spacer 72 includes a radially extending slot 126 that is shaped to receive the body portion 100 of the plug housing 70. Finally, a cap 74 is located over the plug housing 70 to keep the components of the coupling assembly 10 in place. A pair of fasteners, such as screws 130, are passed through a set of holes 132 in the cap 74 and the apertures 120, 122 in the spacer 72, and are received in two of the outer threaded holes 116 in the conductive nut 52. As shown in FIG. 11, the cap 74 also includes an inwardly extending arm 140 that is shaped to engage the rear surface 146 of the plug housing 70 (that is, the surface opposite the nozzle 92).

When the conductive nut 52 is tightened over the connector end 48 of the rod 34, the orientation of the nut when it becomes fully tightened is not known in advance. Because the outer threaded holes 116 in the conductive nut 52 cannot be precisely located, the arcuate apertures 120, 122 in the spacer 72 provide a range of locations to ensure that at least one outer threaded hole is accessible through each of the apertures 120, 122. The body portion 100 of the plug housing may be located at various angles within the flange 114 of the strut base 42 depending upon the orientation of the slot 126 in the spacer 72 after the spacer 72 is coupled to the nut 52. The cap 74 includes a cutout 142 in its forwardly extending flange 144 to accommodate the range of positions of the body portion 100.

As shown in FIG. 11, the threaded end 48 of the rod 34 includes a recess 150, and the conductor 64 terminates in an end 152 inside the recess 150. When the connector assembly 10 is mounted on the outer cylinder 36, the nozzle 92 and cylindrical connector 96 are received in the recess 150 such that the cylindrical connector 96 receives the end 152 of the conductor 64 therein. The elastomer seal 86 helps to seal the recess 150 and the outer cylinder 36.

As noted earlier, the ground lead 80 includes a coupling portion 102 that extends on a forward outer surface 88 of the plug housing 70. When the coupling assembly 10 is assembled, the conductive spacer 72 is pressed into contact with the coupling portion 102 to electrically engage the coupling portion 102. In this manner, the ground lead 80 is electrically coupled to the spacer 72. Because the spacer 72 is in contact with the nut 52, which is in turn in contact with the rod 34, the ground lead 80 is also electrically connected to the rod 34 and portions of the piston 22. In this manner the spacer 72, nut 52, rod 34 and portions of the piston 22 all act as ground.

Once the coupling assembly 10 is fully assembled, an external plug may be inserted into the port 104 of the plug housing 70. The external plug (not shown) will typically include a power wire and a ground wire. Thus, when the external plug is received in the port 104, the power wire is connected to the power lead 78, which thereby connects the power wire to the conductor 64 and coil 24. Similarly, the ground wire is connected to the ground lead 80 and a ground is formed by the conductive nut 52, spacer 72 and rod 34.

Figure 12:
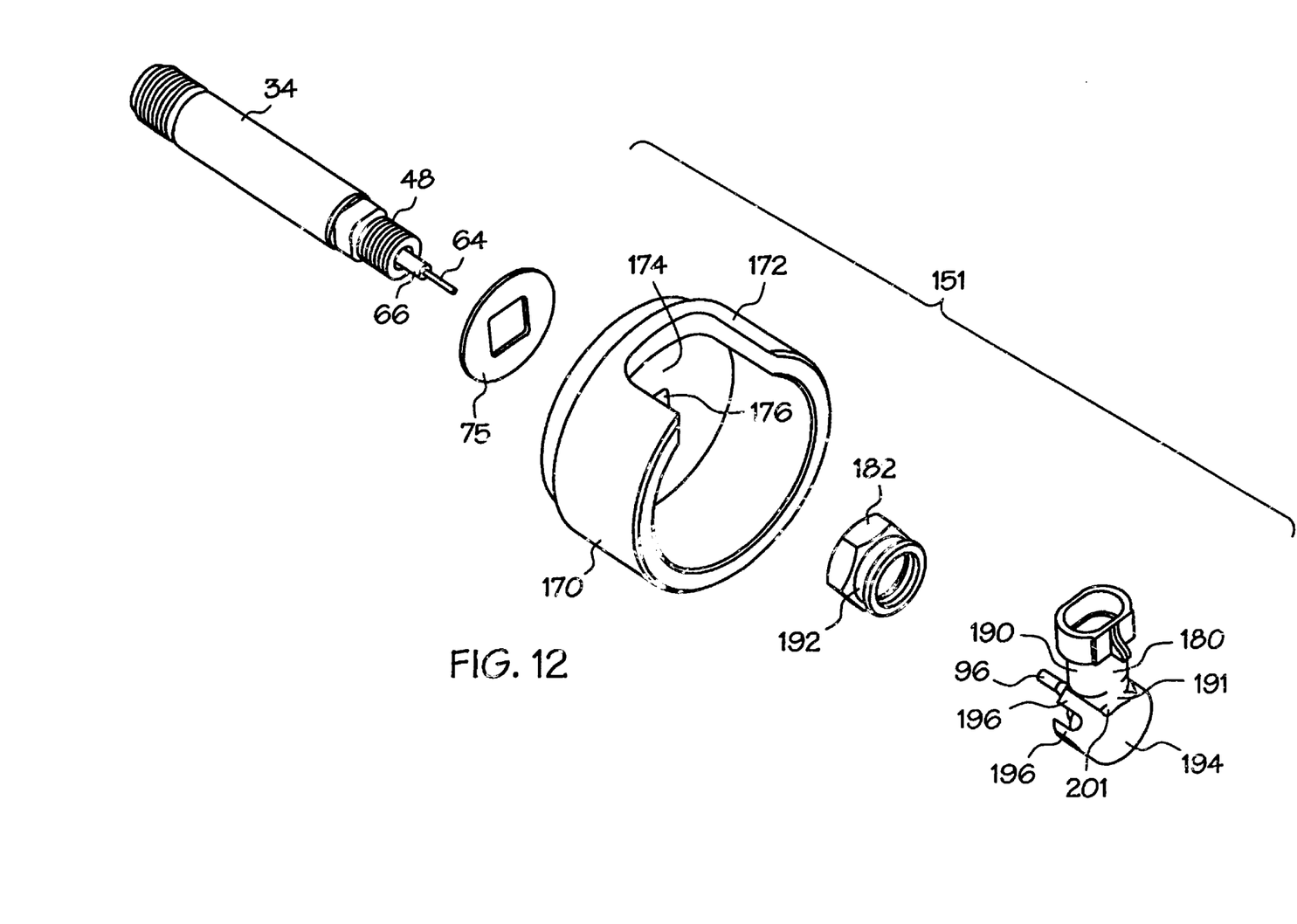
FIG. 12 is an exploded perspective view of an alternate embodiment of the coupling assembly of the present invention.
Figure 13:
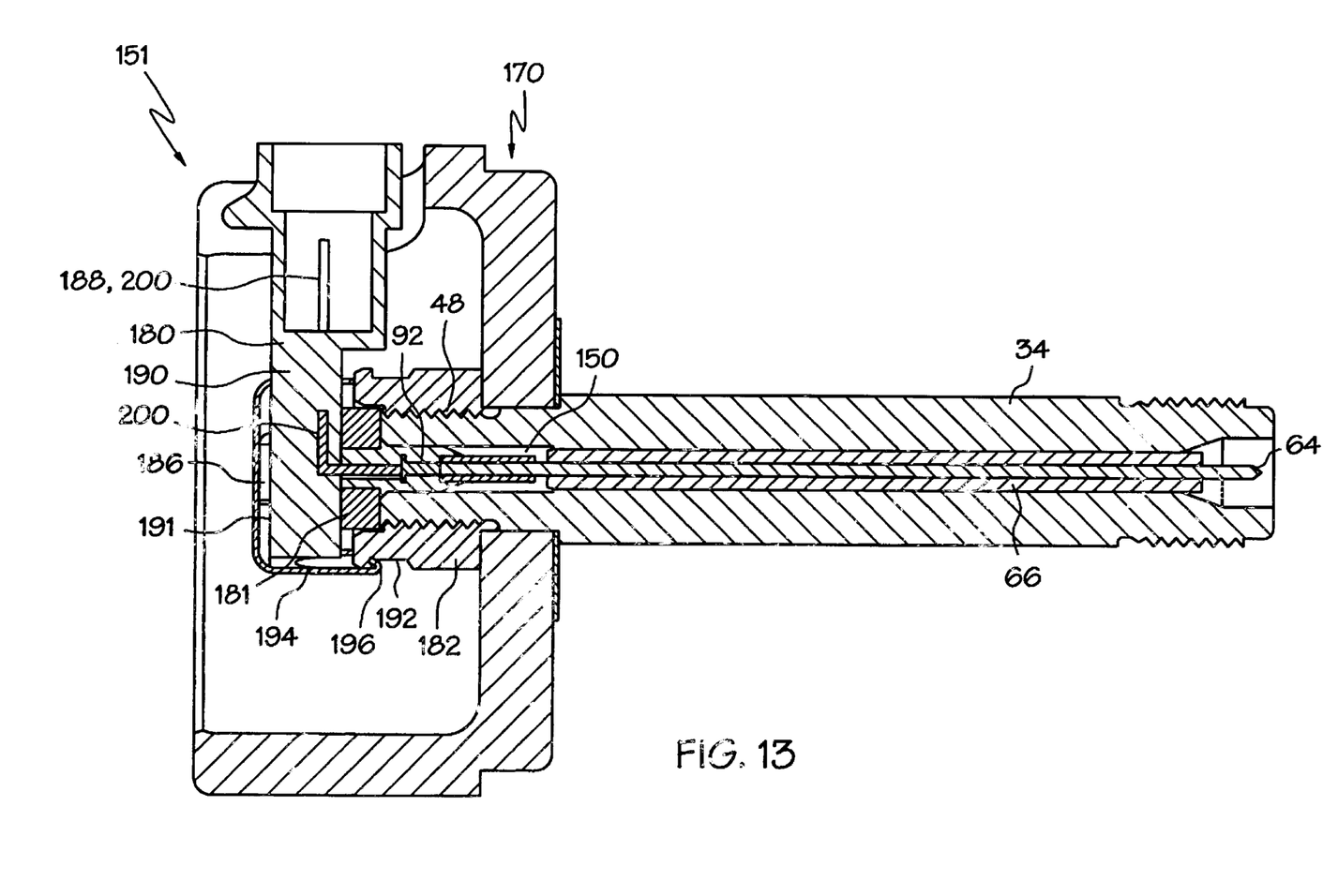
FIG. 13 is a side elevation in section of the coupling assembly of FIG. 12.

A preferred embodiment of the invention is shown in FIGS. 12–13. In this embodiment, the strut base 170 includes a generally cylindrical side wall 172 and a base 174 having a central hole 176 that receives the connector end 48 of the rod 34 therethrough. The plug housing 180 does not extend radially outwardly of the strut base 170, and thus the plug housing 180 is protected by the strut base 170 (FIG. 13).

As shown in FIG. 13, a seal 181, such as a ring seal made of rubber, synthetic rubber or another elastomer, is located radially inwardly of the conductive nut 182 and between the rod 34 and the plug housing 180. In this embodiment, the coupling portion 186 of the ground lead 188 protrudes through the body 190 of the plug housing 180 and is located on the rear surface 191 of the body 190.

The conductive nut 182 includes a generally annular groove 192 extending around its outer surface. The coupling assembly 151 includes a conductive cap 194 that fits around a lower end of the plug housing 180. The cap 194 includes a plurality of flanges 196 shaped and located to engage the groove 192. In this manner the coupling assembly 151 can be assembled easily by mounting the components in the illustrated positions, and then snapping the flanges 196 of the conductive cap 194 into the groove 192 in the conductive nut 182. The conductive cap 194 includes a notch 201 to receive the body portion 190 of the plug housing 180 therein (FIG. 12).

When the coupling assembly 151 is fully assembled, the conductive cap 194 holds the conductive nut 182, seal 181, and plug housing 180 in close engagement. The seal 181 helps to ensure that the coupling assembly 151 is fluid tight relative the surrounding atmosphere. Furthermore, the conductive cap 194 engages the coupling portion 186 of the ground lead 188, and thereby electrically couples the ground lead 188 to the conductive nut 182 and the rod 34. This connects the ground lead 188 to a ground source. The nozzle 92 of the plug housing 180 is received in the recess 150 in the rod 34 such that the power lead 200 is electrically coupled to the conductor 64 in a manner similar to the embodiment of FIGS. 1–11.

Having described the invention in detail and by reference to preferred embodiments thereof, it will be apparent that modifications and variations are possible without departing from the scope of the invention.

What is claimed is:

1. An electrical coupling assembly for a magnetorheological damper comprising:
    a base shaped to attach to a strut tube;
    a rod for supporting a strut piston within the strut tube, said rod extending through said base and having a threaded connector end and a conductor extending through said rod from said connector end;
    a conductive nut threaded onto said connector end of said rod to secure said rod to said base;
    a plug housing including a ground lead and a power lead, said power lead being connected to said conductor; and
    a conductive member engaging said plug housing and said nut, said conductive member being connected to said ground lead.

2. The electrical coupling assembly of claim 1 wherein said base is shaped to engage an open end of a strut tube.

3. The electrical coupling assembly of claim 2 wherein said base is generally cylindrical.

4. The electrical coupling assembly of claim 1 wherein said plug housing is located between said conductive member and said nut.

5. The electrical coupling assembly of claim 4 wherein said conductive nut is located between said plug housing and said base.

6. The electrical coupling assembly of claim 1 wherein said conductive member is coupled to said conductive nut.

7. The coupling assembly of claim 4 further comprising a seal located between said rod and said plug housing.

8. The coupling assembly of claim 7 wherein said seal is located generally radially inwardly of said conductive nut.

9. The coupling assembly of claim 4 wherein said coupling assembly is fluid tight to seal said connector end relative the surrounding atmosphere.

10. The coupling assembly of claim 1 wherein said conductive member electrically couples said ground lead to said nut.

11. The coupling assembly of claim 4 wherein said conductive member fits about a lower end of said plug housing.

12. The coupling assembly of claim 1 wherein said plug housing includes a port to receive an external plug therein such that said ground lead and said power lead are electrically coupled to said external plug when said external plug is received in said port.

13. The coupling assembly of claim 4 wherein said conductive member couples said plug housing to said nut.

14. The coupling assembly of claim 13 wherein said nut includes an annular groove and said conductive member includes a flange shaped to engage said groove to couple said conductive member to said nut.

15. The coupling assembly of claim 14 further comprising a plurality of flanges located around the perimeter of said conductive member, said flanges being shaped to engage said groove.

16. The coupling assembly of claim 1 wherein said ground lead includes a coupling portion located on an external surface of said plug housing, said coupling portion being located to contact said conductive member.

17. The coupling assembly of claim 16 wherein said coupling portion is located on a rear surface of said plug housing.

18. The coupling assembly of claim 16 where in said coupling portion is located on a front surface of said plug housing.

19. The coupling assembly of claim 1 wherein said power lead contacts said conductor to electrically couple said power lead and said conductor.

20. The electrical coupling of claim 1 wherein said plug housing includes a forwardly-extending nozzle through which said power lead extends.

21. The electrical coupling of claim 20 wherein said rod includes an axially extending recess to receive said nozzle therein such that said power lead is electrically coupled to said conductor.

22. The coupling assembly of claim 1 wherein said strut base includes a central hole to receive said rod therethrough.

23. The coupling assembly of claim 1 further comprising a piston located on a distal end of said rod, said piston including a coil that is electrically coupled to said conductor.

24. The coupling assembly of claim 23 wherein said piston is immersed in magnetorheological fluid, and wherein the flow of current through said piston is controllable to control the flow rate of magnetorheological fluid that flows through said piston.

25. The coupling assembly of claim 24 wherein said strut tube extends generally vertically, and wherein said coupling assembly is located at the bottom of said strut tube.

26. The coupling assembly of claim 1 further comprising a washer captured between said rod and said strut base.

27. The coupling assembly of claim 1 wherein said strut base includes a generally cylindrical side wall and a base having a central hole which receives said connector end therethrough.

28. The coupling assembly of claim 27 wherein said side wall of said strut base includes a notch shaped to receive said plug housing therethrough.

29. The coupling assembly of claim 1 wherein said conductive member is located between said conductive nut and said plug housing.

30. The coupling assembly of claim 29 wherein said conductive member includes a central hole to receive said plug housing therethrough.

31. The coupling assembly of claim 29 further comprising an outer cap attached to said conductive nut, said plug housing and said conductive member being located between said outer cap and said conductive nut.

32. The coupling assembly of claim 31 further comprising a pair of threaded fasteners passed through said outer cap and said conductive member and received in said conductive nut.

33. The coupling assembly of claim 32 wherein said conductive nut includes a plurality of threaded holes about the periphery of said conductive nut for receiving said pair of fasteners.

34. The coupling assembly of claim 32 wherein said conductive member includes a pair of apertures to receive said fasteners therethrough.

35. The coupling assembly of claim 34 wherein said apertures are generally arcuate to provide a range of locations for receiving said fasteners therethrough.

36. The coupling assembly of claim 29 wherein said conductive member includes a recess shaped to receive said plug housing therein.

37. The coupling assembly of claim 29 wherein said plug housing includes a body portion extending at a right angle to a nozzle, and wherein said strut base includes a flange to protect said body portion.

38. An electrical coupling assembly for a magnetorheological damper comprising:
   a generally cylindrical base shaped to engage the open end of a strut tube;
   a rod for supporting a strut piston within the strut tube, said rod extending through said base and having a threaded connector end and a conductor extending through said rod from said connector end;
   a conductive nut threaded onto said connector end of said rod to secure said rod to said base;
   a plug housing including a ground lead and a power lead, said power lead being connected to said conductor;
   a conductive cap receiving said plug housing and being coupled to said nut, said conductive cap being connected to said ground lead, wherein said plug housing is located between said conductive cap and said nut; and
   a seal located between said rod and said plug housing, said seal being generally radially inwardly of said conductive nut.

39. A method for electrically coupling a damper to a vehicle's electrical system, comprising the steps of:
   selecting a damper having an electrical coupling assembly comprising a base, a rod received through the base and having a threaded connector end and a conductor extending through said rod from said connector end, a conductive nut threaded onto said connector end of said rod, a plug housing including a ground lead and a power lead, said power lead being electrically coupled to said conductor; and a conductive member engaging said plug housing and said nut, said conductive member being electrically coupled to said ground lead; and
   plugging an external plug having a power line and a ground line into said plug housing such that said power line is electrically coupled to said power lead and said ground line is electrically coupled to said ground lead.

40. A magnetorheological damper for damping forces applied to a wheel suspension assembly of a vehicle comprising:
   an inner tube filled with magnetorheological fluid and adapted for connection to a frame of said vehicle;
   a piston located in said inner tube;
   a rod connected to said piston and extending through said inner tube, said rod having a conductor extending along a length thereof;
   an outer tube concentric with said inner tube, said outer tube being connected to said rod and attachable to said wheel suspension assembly of said vehicle; and
   an electrical coupling assembly connected to said rod and electrically coupled to said conductor, said coupling assembly having a plug housing for receiving an external plug and for electrically coupling said external plug to said conductor,
   wherein the external plug includes a ground lead, and wherein said electrical coupling assembly includes a conductive member that connects said ground lead to a ground source.

41. The damper of claim 40 wherein said plug housing is coupled to said conductive member.

* * * * *